United States Patent [19]

Nemoto et al.

[11] Patent Number: 4,907,401
[45] Date of Patent: Mar. 13, 1990

[54] DRIVE ASSEMBLY FOR WALKING MOWERS

[75] Inventors: Shusuke Nemoto, Yao; Norihiro Ishii; Hiroaki Shimizu, both of Itami, all of Japan

[73] Assignee: Kanzaki Kokyukoki Mfg. Co., Ltd., Amagasaki, Japan

[21] Appl. No.: 363,474

[22] Filed: Jun. 8, 1989

[30] Foreign Application Priority Data

Jun. 24, 1988 [JP] Japan .............. 63-84149[U]

[51] Int. Cl.$^4$ ............................. A01D 69/10
[52] U.S. Cl. ..................................... 56/11.3
[58] Field of Search ............ 56/10.8, 11.3–11.7; 192/0.04, 0.055, 0.084, 3.51, 3.61, 3.62

[56] References Cited

U.S. PATENT DOCUMENTS

| 4,409,779 | 10/1983 | Bent et al. | 56/11.3 |
| 4,416,107 | 11/1983 | Hoff | 56/11.3 |
| 4,428,180 | 1/1984 | Carlson | 56/11.3 |
| 4,466,232 | 8/1984 | Beugelsdyk et al. | 56/11.3 X |
| 4,503,958 | 3/1985 | Nishio | 56/11.3 X |

FOREIGN PATENT DOCUMENTS 58-32578 7/1983 Japan .
62-193815 12/1987 Japan .

Primary Examiner—Thuy M. Bui

[57] ABSTRACT

A transmission casing (3) having a wheel axle (6) extending leftwards and rightwards therefrom is supported by a machine frame (1) rotatably about the axle for providing a main clutch (9) which is engaged and disengaged by a selective tightening and loosening of an input belt (8) for the transmission casing as a result of a selective rotational displacement of the casing. An auxiliary clutch (10) is disposed within the casing and between a speed-change mechanism (7) and the axle. These clutches (9, 10) are normally kept disengaged by individual spring means (12, 13).

A rotatable clutch-control arm (11; 116) is provided which is operated by a clutch lever (14) so as to engage the auxiliary clutch (10). Upon completion of an engagement of this clutch, the control arm is engaged to a stop means (15) on the transmission casing such that further rotational displacement of this arm causes a rotational displacement of the casing towards a direction of engaging the main clutch (9).

The main and auxiliary clutches co-operate to lighten a speed-change operation and mower-moving operation by an operator. The main clutch is simple in structure and both of the clutches are operated by a single operating system.

4 Claims, 8 Drawing Sheets

DRIVE ASSEMBLY FOR WALKING MOWERS

FIELD OF THE INVENTION

This invention relates to a drive assembly, including a speed-change mechanism, for self-propelled walking mowers.

BACKGROUND OF THE INVENTION

As is disclosed in, for example, JP, Y2 No. 58-32578, a drive assembly for propelling a walking mower according to the prior art is, in general, fashioned such that it transmits power of an engine to left and right drive wheels without a speed-change control and only with a speed-reduction control. Further, this kind of drive assembly is fashioned to include a clutch, operable to interrupt transmission of power to the drive wheels, for enabling an operator to move the mower by pushing or pulling same and for an easy turning operation of the mower by the operator. This clutch is, in general, fashioned such that it is kept in its disengaged condition by a clutch spring and is brought into an engaged condition when a clutch lever affixed to a steering handle is grasped.

Meanwhile, it is believed very convenient if speed of a walking mower could be selected from plural variable speeds in accordance with height and/or density of turfs, operator's liking and so on. Further, it is wished to travel a walking mower with a relatively high speed when the mower is not used for mowing and is merely travelled.

There is known from JP,A(U) No. 62-193815 a drive assembly for walking mowers which includes a speed-change mechanism, although it provides only two variable speeds. In this known drive assembly, a ball clutch is disposed within a transmission casing at a driving side of the speed-change mechanism. When a shifting operation of the speed-change mechanism is carried out, the clutch is once disengaged for lightening the operation.

However, there is a limit, in the structure known from JP,A(U) No. 62-193815, with respect to the lightness of a shifting operation. This is because, even when the clutch at the driving side of a speed-change mechanism has been disengaged prior to a shifting operation of the change mechanism, the speed-change mechanism remains connected with left and right drive wheels so that speed-change gears cannot be freely rotatable due to a resistance applied from the side of drive wheels and, therefore, a resistance against the shifting operation is provided.

Further, even when the clutch has been disengaged for an easy moving or turning of the mower by an operator, the mower is moved or turned by the operator under a condition where a rotational motion is provided to one of speed-change gear trains of the speed-change mechanism by the drive wheels which are rotated as the mower is moved or turned. Consequently, a speed-change gear train which also functions as a speed-reduction gear train may provide a resistance against the operator's mower-moving or -turning operation.

In a self-propelled walking mower, left and right rear wheels are, in general, used as drive wheels. It is often experienced, when such mower is started to travel by engaging a ball clutch or a dog clutch, that a floating state of front wheels is caused due to a too quick engagement of the clutch.

OBJECTS

Accordingly, a primary object of the present invention is to provide a novel drive assembly for self-propelled walking mower in which main and auxiliary clutches are provided in a fashion such that a wheel axle may be disconnected from a speed-change mechanism by the auxiliary clutch while a shock-free start of the mower is assured by the main clutch. An attendant object of the present invention is to provide an improved drive assembly in which mechanism for achieving the primary object set forth above is provided without complicating the assembly so as not to highten the manufacturing cost.

BRIEF DESCRIPTION OF THE DRAWINGS

Other objects and advantages of the invention will become readily apparent as the specification is considered in conjunction with the accompanying drawings, in which.

SUMMARY OF THE INVENTION

Figure 2:
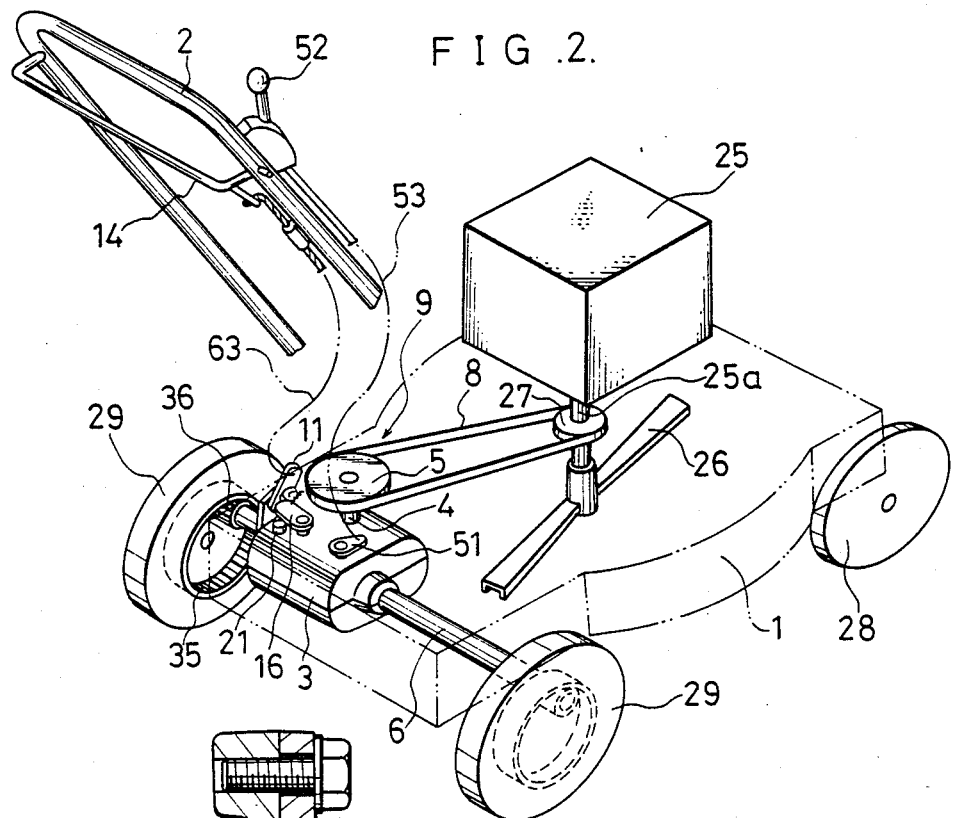
FIG. 2 is a schematic perspective view, partially cut away, of the walking mower set forth above.

The present invention relates to a drive assembly for self-propelled walking mowers which comprises, as shown in FIG. 2, a transmission casing 3 supported by a machine frame 1 which has a steering handle 2; an input shaft 4 extending outwardly from the transmission casing 3 and having thereon an input pulley 5 at an outside of the transmission casing; a wheel axle 6 extending leftwards and rightwards from the transmission casing 3; and a speed-change mechanism 7(FIG. 6) disposed within the transmission casing 3 and operable to transmit a rotation of the input shaft 4 to the wheel axle 6 with stepwisely changeable speeds of rotation.

According to the present invention, the transmission casing 3 is supported by the machine frame 1 through the wheel axle 6 rotatably about the axle so as to provide a main clutch 9 which is operable to continue and discontinue input of power into the transmission casing by a selective tightening and loosening of a belt 8, entrained over the input pulley 5, as a result of a selective rotational displacement of the transmission casing 3. A first spring means 12 shown in FIG. 1 is provided which biases the transmission casing 3 to rotate towards a direction of disengaging the main clutch 9.

Figure 8:
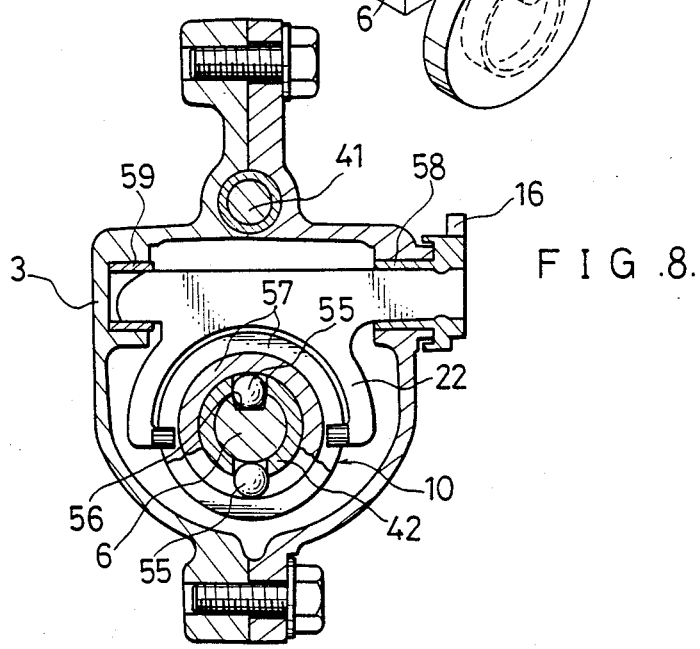
FIG. 8 is a sectional view taken generally along line VIII—VIII of FIG. 6.
Figure 6:
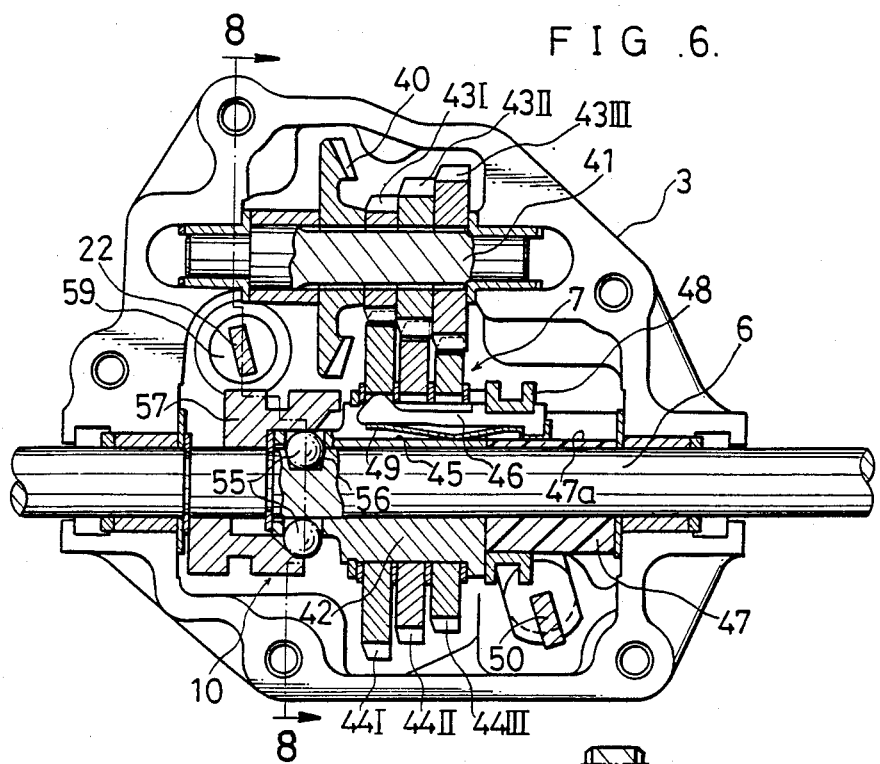
FIG. 6 is a sectional plane view of a transmission casing employed in the first embodiment.

Within the transmission casing 3 is disposed an auxiliary clutch 10, as shown in FIGS. 6 and 8, which is operable to connect and disconnect between the speed-change mechanism 7 and wheel axle 6. This auxiliary clutch 10 is fashioned such that it is kept in its disengaged condition by a second spring means 13 shown in FIG. 1. A clutch lever 14 shown in FIG. 2 is provided to the steering handle 2 for operating the auxiliary clutch 10 to engage through a rotatable clutch control arm 11 (FIGS. 1 and 2) or 116 (FIG. 11) which is disposed outside the transmission casing 3 and is supported by the casing.

Figure 1:
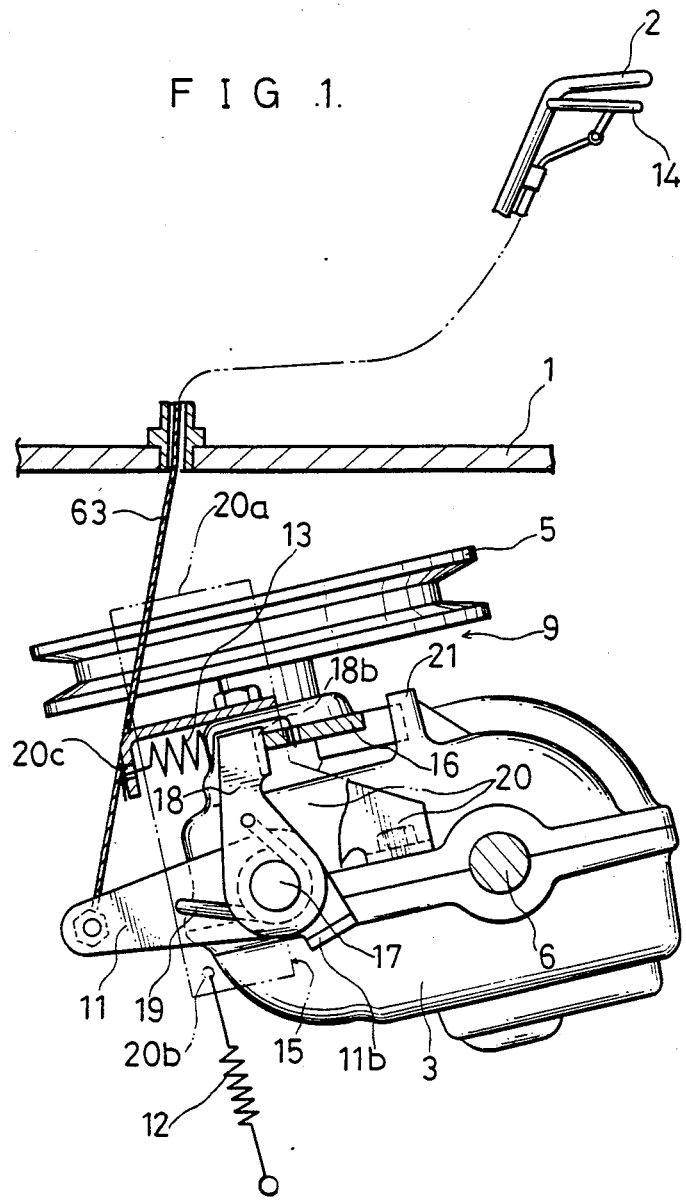
FIG. 1 is a sectional side view of a part of a self-propelled walking mower in which a first embodiment of the drive assembly according to the present invention is employed.

As shown in FIG. 1, the transmission casing 3 carries at an outer surface thereof a stop means 15 which is operable, when the clutch lever 14 is operated so as to engage the auxiliary clutch 10 and after this clutch 10 has been engaged, to limit a rotational displacement of the control arm 11 or 116 relative to the transmission casing 3 so that the casing 3 is rotated in unison with the control arm towards a direction of engaging the main clutch 9.

In a preferred embodiment shown in FIGS. 1 to 10, an auxiliary clutch-actuating arm 18 is provided which is supported by a pivot pin 17 for the control arm 11 rotatably relative to the control arm and is connected co-rotatably with the control arm 11 through a torque spring means 19 such that the auxiliary clutch 10 is engaged by the control arm 11 through the auxiliary clutch-actuating arm 18. The transmission casing 3 has thereon a limiting portion 21 which defines a limit of a rotational displacement of the auxiliary clutch-actuating arm 18 towards a direction of engaging the auxiliary clutch 10.

Figure 11:
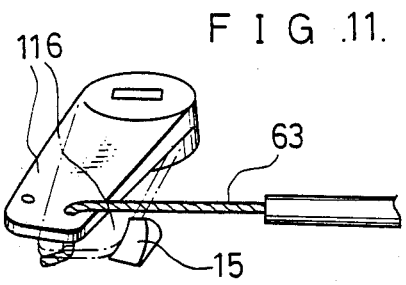
FIG. 11 is a schematic perspective view showing a part of a second embodiment of the drive assembly according to the present invention.

The main and auxiliary clutches 9 and 10 are controlled as follows:

FIG. 1 and FIG. 11 illustrate, respectively, a state where both of the main and auxiliary clutches 9 and 10 are disengaged. When the clutch lever 14 provided to the steering handle 2 is operated so as to engage the clutches, the transmission casing 3 is kept in its original position by the first spring means 12 until the control arm 11 or 116 has been displaced rotationally to an angular position shown in FIG. 9 or shown in phantom in FIG. 11 where the control arm is in abutment with the stop means 15. Consequently, the auxiliary clutch 10 shown in FIGS. 6 and 8 is engaged firstly by such independent rotational displacement of the control arm 11 or 116. From the state shown in FIG. 9 or in phantom in FIG. 11, the transmission casing 3 is rotated about the wheel axle 6 in unison with the control arm 11 or 116 so that the input pulley 5 is displaced to a position shown in FIG. 10 where the belt 8 shown in FIG. 2 is tightened and, therefore, the main clutch 9 is engaged. During such engaging process of the main clutch 9, the pulley 5 is displaced gradually from the position shown FIG. 9 to the position FIG. 10 by a rotational displacement provided to the transmission casing 3 against the biasing force of the first spring means 12 so that the belt 8 is tightened gradually from a loosened condition. Consequently, running speed of the belt 8 is heightened gradually to its regular speed and, therefore, the main clutch 9 is engaged without a shock.

In the structure, set forth before, that a pair of the arms 11 and 18 are supported independently rotatably about a common pivot pin 17 and are connected co-rotatably with each other through a torque spring means 19, when clutch elements of the driving and driven sides of the auxiliary clutch 10 are not in proper angular positions for achieving an engagement with each other, operating force applied to the control arm 11 is once stored in the yieldable spring means 19 and then effects the engagement between the clutch elements, when they are properly aligned, so that an undue force is not applied to the auxiliary clutch 10. The limiting portion 21 on the transmission casing 3 will protect the belt-pulley mechanism in co-operation with the arm 18 and torque spring means 19 at the end of a clutch-engaging operation in a manner which will be detailed hereinafter. When the clutch lever 14 is operated further from the clutch-engaged condition shown in FIG. 10, force applied to the transmission casing 3 from the belt 8 under tension through the input pulley 9 is in turn applied through the limiting portion 21 to the auxiliary lutch-actuating arm 18 so that the actuating arm 18 is displaced rotationally against the force of yieldable spring means 19. Consequently, an excessive force which may be applied to the belt 8 and pulley 5 at the end of a clutch-engaging operation is absorbed by the torque spring means 19 so that the belt-pulley mechanism is protected. In the drive assembly shown, it is fashioned that the auxiliary clutch 10 is engaged by the auxiliary clutch-actuating arm 18 through a clutch arm 16 rotatable in unison with a clutch fork 22 for the auxiliary clutch 10 and the limiting portion 21 is arranged such that it provides a limit of a rotational displacement of the clutch arm 16 so as to limit a rotational displacement of the actuating arm 18 towards the direction of engaging the auxiliary clutch 10.

When the clutch lever 14 is released, the transmission casing 3 is displaced rotationally by the first spring means 12 to the angular position shown in FIG. 1 so that the main clutch 9 is disengaged. The auxiliary clutch 10 is disengaged by the biasing force of the second spring means 13 and, at the same time, the control arm 11 or 116 (and also the auxiliary clutch-actuating arm 18 in the structure in which this arm is provided) is (are) displaced rotationally to the original angular position(s).

In a condition where both of the clutches are disengaged, input of power into the transmission casing 3 is interrupted by the main clutch and the wheel axle 6 is disconnected from the speed-change mechanism 7. Consequently, a shifting operation of the speed-change mechanism 7 can be carried out without a resistance applied from drive wheels and a mower-moving operation by an operator can be carried out under a condition that the speed-change mechanism 7 provides no resistance against the mower-moving operation.

When the clutch lever 14 is operated again so as to engage the clutches, the auxiliary clutch 10 is engaged firstly and then the main clutch 9 is engaged without a shock, as detailed before, so that the mower begins to start very smoothly.

The main clutch 9 employed in the drive assembly according to the present invention is fashioned such that a belt 8 for transmitting power into the transmission casing 3 is tightened and loosened selectively by a selective rotational displacement of the transmission casing itself about the wheel axle 6. This structure requires no additional elements for a main clutch. Further, the main and auxiliary clutches 9 and 10 are fashioned according to the present invention such that they are operated by a single operating system which is similar to an operating system for a single clutch. It is thus seen that the mechanism according to the present invention is very simple in structure and keeps the manufacturing cost therefor low.

In the drive assembly shown in FIGS. 1 to 10, a frame plate 20 is fixedly mounted on an outer surface of the transmission casing 3. The plate 20 is preferably fashioned to include an integral plate portion 20a which is opposed to a portion of the outer circumference of input pulley 5 so as to prevent a falling-off of the belt 8 when the belt is in a loosened condition.

For a simplicity of machining with respect to the transmission casing 3, the frame plate 20 is preferrably fashioned to include further the stop means 15 and pivot pin 17, set forth before, and also support portions 20b and 20c for hooking respective one ends of the first and second spring means 12 and 13.

DESCRIPTION OF PREFERRED EMBODIMENTS

In FIGS. 1 to 10, a first preferred embodiment is shown.

In a self-propelled walking mower schematically shown in FIG. 2, an engine 25 is mounted on the machine frame 1 and has an output shaft 25a extending downwardly through the frame 1. The output shaft 25a carries at its lower end a mowing cutter 26 and at an under side of the machine frame an output pulley 27 for transmitting power to the belt 8 and input pulley 5 both referred to before. Left and right front wheels 28 are supported freely rotatably by a front end portion of the machine frame 1. Left and right rear wheels 29 constituting drive wheels for the mower shown are provided such that they are driven to rotate by the wheel axle 6 referred to before.

Figure 3:
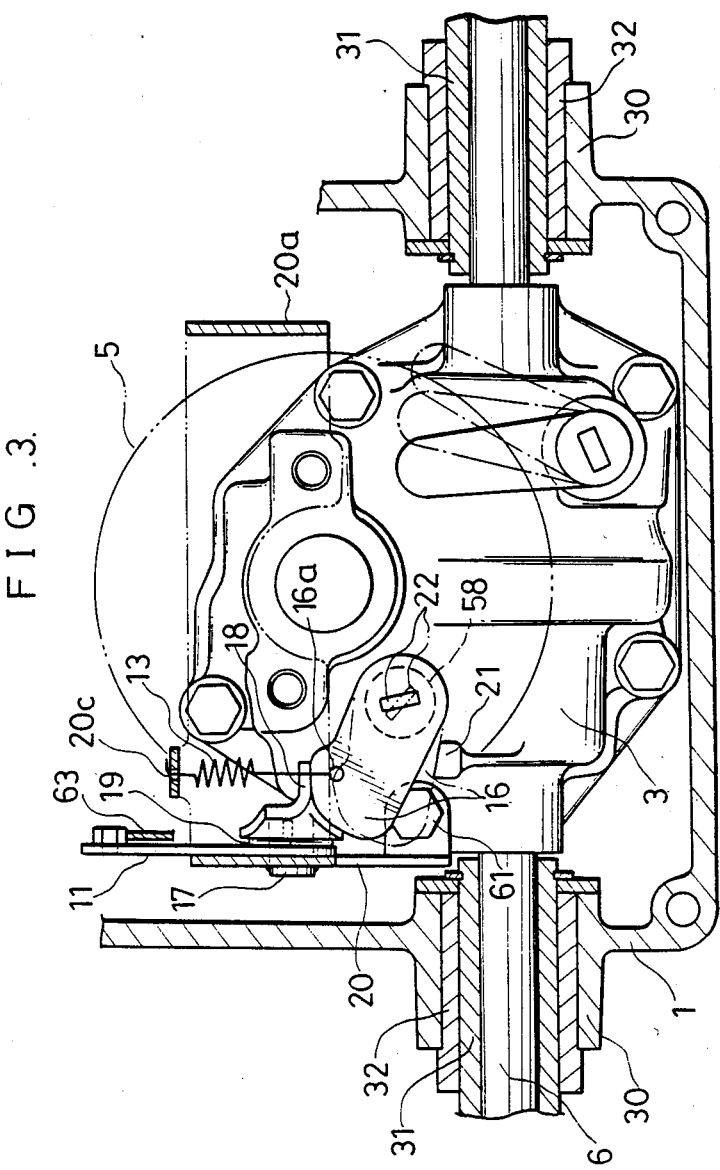
FIG. 3 is a sectional plane view of a part of the walking mower set forth above.
Figure 4:
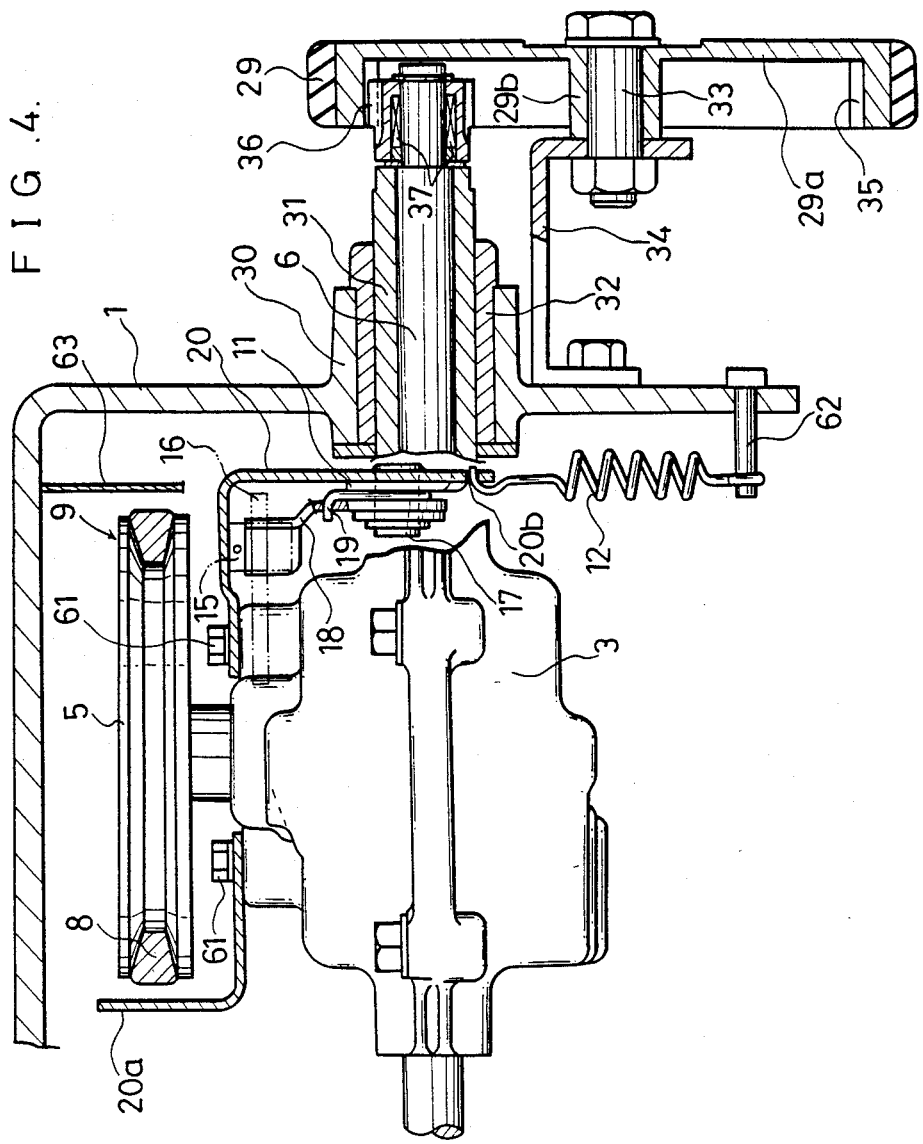
FIG. 4 is a sectional rear view of a part of the walking mower set forth above.

As shown in FIGS. 3 and 4, the machine frame 1 includes integral left and right cylindrical support portions 30 by which the wheel axle 6 is received rotatably through inner outer cylindrical members 31 and 32 so that the transmission 3 is supported by the machine frame rotatably about the wheel axle 6. As shown in FIG. 4 with respect to the rear wheel 29 of one side, each of the rear wheels 29 is supported such that a pin 33 supporting rotatably the wheel disk 29a of each rear wheel 29 at a central boss 29b of the disk is secured to a wheel-supporting plate 34 which is attached to each side wall of the machine frame 1. The wheel disk 29a is formed with an internal gear 35 with which is meshed a pinion gear 36 mounted on each end portion of the axle 6 through a one way clutch 37 so that rotation of the wheel axle is transmitted to each rear wheel 29 with a reduced speed of rotation.

Figure 7:
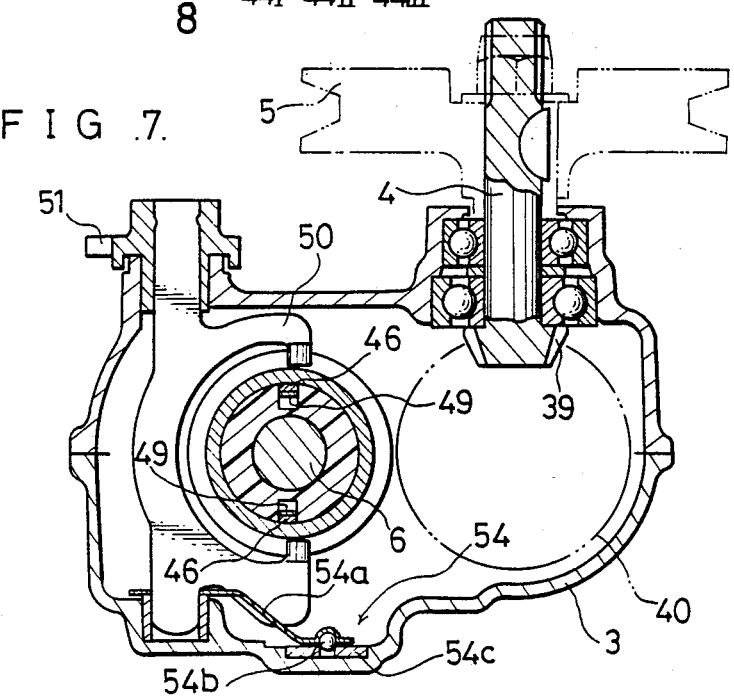
FIG. 7 is a sectional side view, partially omitted, of the transmission casing shown in FIG. 6.

As shown in FIGS. 6 to 8, there are disposed within the transmission casing 3 a drive shaft 41, which is driven to rotate by the input shaft 4 referred to before through meshing bevel gears 39 and 40, and a hollow speed-change shaft 42 which is mounted rotatably on the wheel axle 6. Three drive gears 43I, 43II and 43III are fixedly mounted on the dive shaft 41, and three speed-change gears 44I, 44II and 44III are rotatably mounted on the speed-change shaft 42. These gears 43I–43III and 44I–44III are meshed respectively so as to provide first to third speed-change gear trains between the shafts 41 and 42. The speed-change mechanism 7 set forth before is fashioned to a key-shift change mechanism, well known in the art, in which the change-gears 44I, 44II and 44III are coupled one at a time to the speed-change shaft 42 using two shift keys 46 which are slidably disposed within elongated axial grooves 45 in the outer surface of the change shaft. The speed-change shaft 42 shown is made of a relatively short hollow metallic shaft, and a hollow support shaft 47 of a polymer material, which includes elongated axial grooves 47a aligned axially with the grooves 45, is rotatably mounted on the wheel axle 6 such that the support shaft 47 constitutes an extension of the change shaft 42. The shift keys 46 are attached to a shifter sleeve 48, slidably mounted on the support shaft 47, and are biased by leaf springs 49 to move towards a direction of coupling the speed-change gears 44I–44III to the change shaft 42. For moving the shifter sleeve 48 to slide, a shift fork 50 is provided which is rotatably supported by the transmission casing 3 about a vertical axis. One end of the shift fork 50 is projected upwardly from the transmission casing and has a shift arm 51 attached thereto which in turn is connected to a change lever 52, provided to the steering handle 2, through a control cable 53 as shown in FIG. 2. In FIG. 7, numeral 54 designates a detent means having a leaf spring 54a rotatable in unison with the shift fork 50, a ball 54b held by the leaf spring, and a latching plate 54c fixedly disposed on the inner bottom surface of the transmission casing 3. The latching plate 54c includes latching holes at which the ball 54b may engage the plate 54c when the shift keys 46 are displaced to respective operative positions thereof where the keys couple the respective speed-change gears 44I, 44II and 44III to the change shaft 42.

The auxiliary clutch 10 shown is fashioned to a ball clutch and is disposed between the hollow change shaft 42 and the wheel axle 6 extending therethrough. As shown in FIGS. 6 and 8, this auxiliary clutch 10 comprises a pair of balls 55 which are received in a pair of radial thorough bores in a diameter-reduced end portion of the hollow change shaft 42. On the wheel axle 6 is slidably mounted a clutch sleeve 57 which is operable, as shown in FIGS. 6 and 8 with respect to an upper half, as viewed in these figures, of the clutch sleeve 57, to push balls 55 radially inwardly of the axle 6 into recesses 56 in the outer surface of wheel axle 6 to thereby engage the clutch 10. The clutch fork 22, referred to before, which is engaged to the clutch sleeve 57 for displacing same is made of a plate material and is supported rotatably about a vertical axis by the transmission casing 3 through upper and lower cylindrical members 58 and 59 which are carried by the fork 22. The clutch arm 16 referred to before is formed integrally with the upper cylindrical member 58. As shown in FIG. 3, the second spring means 13 referred to before is hooked at both ends thereof to a support portion or hole 16a of the clutch arm 16 and to the support portion or hole 20c of frame plate 20, referred to before, such that the spring means 13 biases the clutch arm 16 and clutch fork 22 to move towards a direction of disengaging the auxiliary clutch 10, namely towards a direction of moving clutch sleeve 57 towards the left as viewed in FIG. 6.

Figure 5:
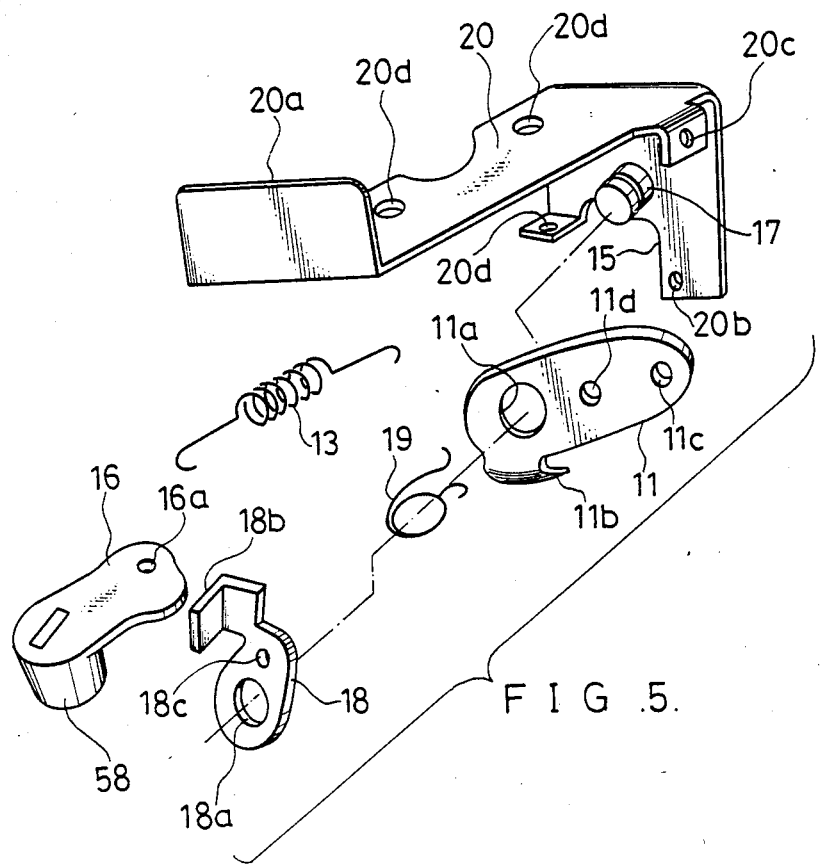
FIG. 5 is a perspective view, showing some members employed in the first embodiment in a diassembled state.

As shown in FIGS. 3 to 5, the frame plate 20 is shaped such that it extends over the upper surface and a side surface of the transmission casing 3. This plate 20 is fixedly secured to the transmission casing using three bolts 61 passing through three holes 20d in the plate 20. The first spring means 12 referred to before is made of a tension spring and is hooked at both ends thereof to the support portion or hole 20b of frame plate 20, referred to before, and to a pin 62 which is attached to a lowermost end portion of the machine frame 1. The pivot pin 17 referred to before is attached to the frame plate 20 by welding. The plate portion 20a for preventing a falling-off of the belt 8 projects upwardly from an end of the frame plate 20 and is opposed to the outer circumfere of pulley 5 with a small interval therebetween.

Figure 9:
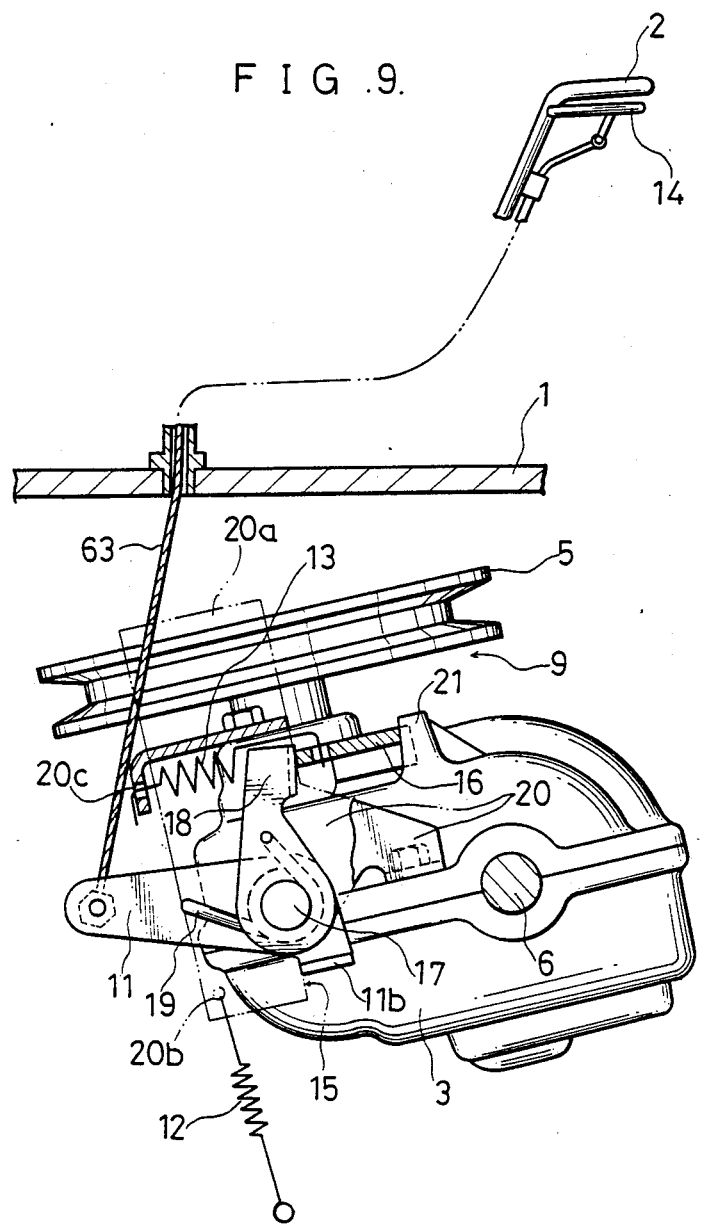
FIGS. 9 and 10 are sectional side views similar to FIG. 1, respectively, for illustrating operation of the first embodiment.
Figure 10:
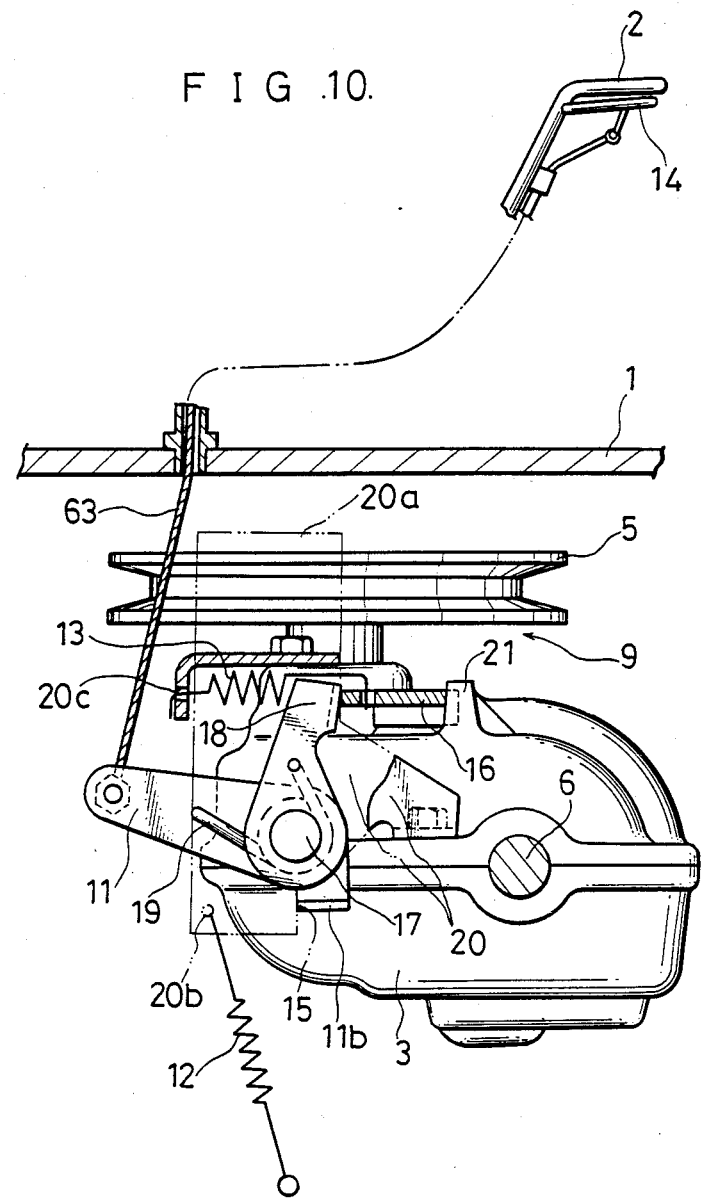

As shown in FIG. 5, the control arm 11 and auxiliary clutch-actuating arm 18, both referred to before, include respectively thorough bores 11a and 18a at which these arms 11 and 18 are rotatably supported by the pivot pin 17. The control arm 11 further includes a stopper projection 11b at which the arm 11 may engage the stop means 15 provided by an edge of the leg portion of frame plate 20, a connecting hole 11c for connecting a control cable 63 which connects, as shown in FIGS. 1 and 2, between the control arm 11 and clutch lever 14, and a support hole 11d for hooking one end of the torque spring means 19. The auxiliary clutch-actuating arm 18 further includes a pushing projection 18b at which the actuating arm 18 may push the clutch arm 16 so as to rotate the last-mentioned arm towards a direction of engaging the auxiliary clutch 10, and a support hole 18c for hooking the other end of torque spring 19. As shown in FIGS. 1 and 3, the limiting portion 21 of transmission casing 3 referred to before is formed integrally with the casing 3 and is disposed on the upper surface thereof such that the clutch arm 16 is engaged to this portion 21, as shown in FIG. 9, after the auxiliary clutch 10 has been engaged.

During a clutch-engaging operation using the clutch lever 14, the auxiliary clutch-actuating arm 18 which is displaced rotationally together with control arm 11 by a pulling action of the control cable 63 pushes at the pushing projection 18b thereof the clutch arm 16 to rotate same against the biasing force of second spring means 13 to the auxiliary clutch-engaging position of clutch arm 16 and, then, is prevented from a further rotational displacement by the limiting portion 21 through the clutch arm 16. On the other hand, the control arm 11 is also prevented, after the auxiliary clutch 10 has been engaged, from a rotational displacement due to an engagement of the stopper projection 11b thereof to the stop means 15 (see FIG. 9) so that pulling force by means of the control cable 63 is then applied to the transmission casing 3 through the control arm 11 and stop means 15. By this, the transmission casing 3 is rotated about the wheel axle 6 to the angular position shown in FIG. 10 so that the main clutch is engaged.

In the second embodiment shown in FIG. 11, a clutch arm similar to the clutch arm 16 employed in the first embodiment is used as the clutch control arm 116, and a projection on the transmission casing similar to the limiting portion 21 provided in the first embodiment is used as the stop means 15.

According to this second embodiment, structure of the assembly is simplified but it is preferred to take measures to meet an excessive pulling possibly applied to the control cable 63. Thus, the control cable including a spring is preferred.

What we claim is:

1. A drive assembly for self-propelled walking mowers which comprises: a transmission casing (3) supported by a machine frame (1) which has a steering handle (2); an input shaft (4) extending outwardly from said transmission casing and having thereon an input pulley (5) at an outside of said transmission casing; a wheel axle (6) extending leftwards and rightwards from an inside of said transmission casing; and a speed-change mechanism (7) disposed within said transmission casing and operable to transmit a rotation of said input shaft to said wheel axle with stepwisely changeable speeds of rotation, characterized in:

that said transmission casing (3) is supported by said machine frame (1) through said wheel axle (6) rotatably about said wheel axle so as to provide a main clutch (9) which is operable to continue and discontinue input of power into said transmission casing by a selective tightening and loosening of a belt (8), entrained over said input pulley (5), as a result of a selective rotational displacement of said transmission casing, said transmission casing being biased by a first spring means (12) to rotate towards a direction of disengaging said main clutch;

that an auxiliary clutch (10) operable to connect and disconnect between said speed-change mechanism (7) and said wheel axle (6) is disposed within said transmission casing (3), said auxiliary clutch being kept in its disengaged condition by a second spring means (13) and adapted to be engaged by a clutch lever (14), provided to said steering handle (2), through a rotatable clutch control arm (11; 116) which is disposed outside said transmission casing and is supported by the said casing; and that said transmission casing (3) carries at an outer surface thereof a stop means (15) which is operable, when said clutch lever (14) is operated so as to engage said auxiliary clutch (10) and after the said clutch has been engaged, to limit a rotational displacement of said control arm (11; 116) relative to said transmission casing so that the said casing is rotated in unison with said control arm towards a direction of engaging said main clutch (9).

2. A drive assembly as claimed in claim 1; wherein an auxiliary clutch-actuating arm (18) rotatable about a pivot pin (17) for said control arm (11) is provided which is supported rotatably relative to said control arm and is connected co-rotatably with said control arm through a torque spring means (19) such that said auxiliary clutch (10) is engaged by said control arm through said auxiliary clutch-actuating arm; and wherein said transmission casing (3) has thereon a limiting portion (21) which defines a limit of a rotational displacement of said auxiliary clutch-actuating arm (18) towards a direction of engaging said auxiliary clutch (10).

3. A drive assembly as claimed in claim 2, wherein a frame plate (20) having said stop means (15) and said pivot pin (17) is fixedly mounted on said outer surface of the transmission casing (3), said frame plate including an integral plate portion (20a) which is opposed to a portion of the outer circumference of said input pulley (5) so as to prevent a falling-off of said belt (8) when the belt is in a loosened condition.

4. A drive assembly as claimed in claim 3, wherein said frame plate (20) further includes a first support portion (20b) for hooking an end of said first spring means (12) and a second support portion (20c) for hooking an end of said second spring means (13).

* * * * *